United States
Gaydasch

[11] 3,673,149
[45] June 27, 1972

[54] FLAME RETARDANT COMPOSITIONS OF MATTER

[72] Inventor: Alexander Gaydasch, Chicago, Ill.

[73] Assignee: Universal Oil Products Company, Des Plaines, Ill.

[22] Filed: Dec. 7, 1970

[21] Appl. No.: 95,946

Related U.S. Application Data

[63] Continuation-in-part of Ser. No. 767,546, Sept. 5, 1968, Pat. No. 3,574,231.

[52] U.S. Cl. ............260/45.8 N, 106/15 FP, 117/136, 117/137, 260/2.5 AJ
[51] Int. Cl. ............C08f 45/60, C08g 51/60
[58] Field of Search............260/45.8 N, 2.5 AJ; 106/15 FP; 117/136, 137

[56] References Cited

UNITED STATES PATENTS

| | | | |
|---|---|---|---|
| 3,208,939 | 9/1965 | Latos et al. | 260/326 |
| 3,294,816 | 12/1966 | Latos et al. | 260/326 |
| 3,371,097 | 2/1968 | Cyba | 260/326 |
| 3,391,112 | 7/1968 | Hayes | 260/326 |
| 3,371,099 | 2/1968 | Geiser | 260/326 |
| 3,440,248 | 4/1969 | Roberts et al. | 260/326 |

Primary Examiner—M. J. Welsh
Assistant Examiner—U. P. Hoke
Attorney—James R. Hoatson, Jr. and Raymond H. Nelson

[57] ABSTRACT

Novel compositions of matter comprising a polymeric compound and an N-substituted polyhalopolyhydropolycyclicdicarboximide as exemplified by polypropylene and quanyl-5,6,7,8,9,9-hexachloro-1,2,3,4,4a,5,8,8a-octahydro-5,8-methano-2,3-naphthalenedicarboximide possess certain physical properties such as being flameproof or fire resistant.

8 Claims, No Drawings

FLAME RETARDANT COMPOSITIONS OF MATTER

CROSS REFERENCE TO RELATED APPLICATIONS

This application is a continuation-in-part of my copending application Ser. No. 767,546 filed Sept. 5, 1968, now U.S. Pat. No. 3,574,231, issued Apr. 6, 1971.

This invention relates to novel compositions of matter comprising a polymeric compound and an N-substituted polyhalopolyhydropolycyclicdicarboximide. More specifically, the invention relates to novel compositions of matter comprising a polymeric compound and an N-substituted polyhalopolyhydropolycyclicdicarboximide in which the substituent on the imide contains at least two nitrogen atoms one of which contains a functional substituent, the composition of matter possessing certain desirable physical characteristics.

It has now been discovered that novel compositions of matter comprising, as hereinbefore set forth, a mixture of a polymeric compound and an N-substituted polyhalopolyhydropolycyclicdicarboximide containing, as a substituent on the nitrogen portion of the imide a radical which contains at least two nitrogen atoms, one of which contains a functional substituent, will possess the desirable physical characteristics of being resistant to flame or being able to retard the advance of a flame throughout the finished article. The N-substituted polyhalopolyhydropolycyclicdicarboximides are useful as additives to plastics, polymers, copolymers, terpolymers, resins, polycondensates, elastomers, rubbers, textiles and fibers, wood and paper, both naturally occurring and synthetic in nature, coatings, paints, varnishes, leather, foams, cellulose acetate butyrate, ethyl cellulose, cellulose propionate, polyolefins such as polyethylene and polyethylene copolymers, synthetic polyethylene paper, polypropylene and polypropylene copolymers, polystyrenes, polystyrene copolymers, polyvinyl acetate or alcohol and copolymers, polyvinyl chloride and copolymers, polyvinylidene chloride and copolymers, polyesters, polyurethane, polyphenyl ethers, styrenated polyphenyl ethers, polycarbonates, polyamides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadiene-styrene formulations (commonly known as ABS), polybutylene and acrylic ester-modified-styreneacrylonitrile (ASA), etc., whereby the desirable physical characteristics of flameproofing or fire retardancy will be imparted to the aforementioned materials. By utilizing the compositions of matter of the present invention, a catalytic and/or synergistic action in which the fire retardance or flameproofing will be greatly enhanced will occur. This particular physical characteristic will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., under hood automotive use, heater ducts, cable and wire coatings, TV-cabinets, appliance housing, car or airplane interior components, automotive vents, etc., boat interiors of exteriors, cushions for various vehicle seats such as airplane seats, automobile seats, bus seats, etc. In addition, the compound when utilized as a constituent of paint, lacquer, varnishes, or protective coatings, films, etc., will also impart a flame resistance to these compounds and, therefore, render them commercially attractive as articles of commerce. Also, besides imparting the desirable physical characteristics of flame retardancy to the various articles of manufacture, the additives will render certain polymeric compositions of matter more stable to color changes and, therefore, will be important components of these compounds whenever it is desirable that discoloration of the finished product is to be avoided or will tend to render such articles unusable.

It is therefore an object of this invention to provide novel compositions of matter which possess desirable physical properties.

Another object of this invention is to provide novel compositions of matter which possess the desirable physical characteristics of flame proofing and fire retardancy when utilized in various shapes and forms.

In one aspect an embodiment of this invention resides in a composition of matter comprising a polymeric compound and an N-substituted polyhalopolyhydropolycyclicdicarboximide in which the substituent on the imide is a radical containing at least two nitrogen atoms, one of which contains a functional substituent.

A specific embodiment of this invention resides in a composition of matter comprising polypropylene and N-quanyl-5,6,7,8,9,9-hexachloro-1,2,3,4,4a,5,8,8a-octahydro-5,8-methano-2,3-naphthalenedicarboximide.

Other objects and embodiments will be found in the following further detailed description of the present invention.

As hereinbefore set forth the present invention is concerned with novel compositions of matter comprising a polymeric compound and an N-substituted polyhalopolyhydropolycyclicdicarboximide in which the substituent on the imide contains certain characteristics hereinafter set forth in greater detail. The N-substituted polyhalopolyhydropolycyclicdicarboximides may be prepared by condensing a polyhalo-substituted polyhydropolycyclicdicarboxylic acid or anhydride thereof with a compound of the type hereinafter set forth in greater detail, one criterion which the compound must possess being that it contain at least three nitrogen atoms in the molecule, at least one of the nitrogens being a primary, unsubstituted, amino group. Any suitable polyhalo-substituted polyhydropolycyclicdicarboxylic acid or anhydride thereof may be used in the preparation of the desired compound, said polyhalo-substituted polyhydropolycyclicdicarboxylic acid or anhydride thereof being illustrated by the following general formulae:

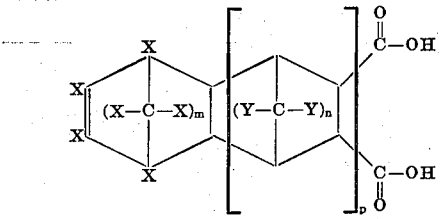

or

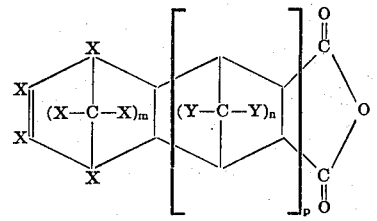

in which X is selected from the group consisting of halogen radicals, particularly chlorine and/or bromine, and hydrogen radicals, at least two of the X's being halogen; Y is also selected from the group consisting of halogen and hydrogen radicals; $m$ is an integer of from 1 to 2; $n$ ranges from 0 to 2 and $p$ ranges from 0 to 1. Representative examples of the polyhalopolyhydropolycyclicdicarboxylic acids or anhydrides thereof which may be utilized include 1,4,5,6,-7,7-hexachlorobicyclo-[2.2.1]-5-heptene-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9-hexachloro-1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro-1,2,3,4,4a,5,8,8a-octahydro-1,4,5,8-dimethano-2,3-naphthalenedicarboxylic acid or its anhydride. It is to be understood that other starting materials may also be utilized to form similar acids or anhydrides. Illustrative examples of these starting materials includes other acids as fumaric acid, itaconic acid, citraconic acid, glutaconic acid, etc.; conjugated aliphatic dienes include 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen atoms and particularly bromine.

The aforementioned polyhalo-substituted polyhydropolycyclicdicarboxylic acids or anhydrides thereof are condensed with polyamino, either open chain or closed chain, compounds which contain at least three nitrogen atoms in the molecule. Some specific illustrative examples of these compounds which may be condensed with the acid or anhydride will include guanidine, biguanide, carbazide, semicarbazide, thiocarbazide, thiosemicarbazide, guanylurea, cyanoguanidine, 2,6-diaminobenzylamine, triaminobenzene (1,2,3-, 1,2,4-, and 1,3,5-), N-p-nitrophenyl-p-phenylenediamine, N-p-aminophenyl-p-phenylenediamine, 2,3-diaminophenazine, 2-amino-4-chloropyrimidine, 4,6-diaminopyrimidine, 2,4-diamino-6-hydroxypyrimidine, 2-aminopyrimidine, 2,4-diaminopyrimidine, 4,6-diaminopyrimidine, 2,4,6-triaminopyrimidine, guanine, 8-azaguanine, guanazole, 1-guanylguanazole, 1-phenylguanazole, 2,3,5-triaminoguanazole, oxaldiamidine, malonediamidine, adipdiamidine, etc., substituted guanidines such as methylguanidine, ethylguanidine, propylguanidine, dimethylguanidine, diethylguanidine, dipropylguanidine, phenylguanidine, benzylguanidine, p-nitrophenylguanadine, tolylguanidine, cyclohexylguanidine, methoxyguanidine, ethoxyguanidine, phenoxyguanidine, p-chlorophenylguanidine, chloromethylguanidine, chloroethylguanidine; hydrochloride and nitrate salts of substituted biguanides such as methylbiguanide hydrochloride, ethylbiguanide nitrate, the corresponding salts of n-propylbiguanide, isopropylbiguanide, allylbiguanide, n-butylbiguanide, isobutylbiguanide, N,N-dimethylbiguanide, N-allyl-N-propylbiguanide, 4-chlorobenzylbiguanide, benzylbiguanide, 2,4-dichlorobenzylguanide, cyclohexylbiguanide, phenylbiguanide, N,N-dibenzylbiguanide, N,N-diallybiguanide, N-4-bromo-N-methylbiguanide, methoxybiguanide, ethoxybiguanide, phenoxybiguanide, p-chlorophenylbiguanide; substituted carbazides such as methylcarbazide, ethylcarbazide, propylcarbazide, 1,1-dimethylcarbazide, 1,1-diethylcarbazide, phenylcarbazide, benzylcarbazide, tolylcarbazide, cyclohexylcarbazide, 1,1-diphenylcarbazide, methoxycarbazide, ethoxycarbazide, phenoxycarbazide, p-chlorophenylcarbazide, etc.; substituted semicarbazides such as methylsemicarbazide, ethylsemicarbazide, propylsemicarbazide, dimethylsemicarbazide, diethylsemicarbazide, dipropylsemicarbazide, 2- and 4-phenylsemicarbazide, benzylsemicarbazide, tolylsemicarbazide, cyclohexylsemicarbazide, 2,4-diphenylsemicarbazide, 2,4-dibenzylsemicarbazide, 2,4-ditolylsemicarbazide, 2,4-dicyclohexylsemicarbazide, methoxysemicarbazide, ethoxysemicarbazide, 2,4-dimethoxysemicarbazide, diethoxysemicarbazide, phenoxysemicarbazide, 2,4-diphenoxysemicarbazide, chlorosemicarbazide, 2,4-dichlorosemicarbazide, bromosemicarbazide, 2,4-dibromosemicarbazide, chlorophenylsemicarbazide, 2,4-di-(chlorophenyl)-semicarbazide, chloromethylsemicarbazide, chloroethylsemicarbazide, 2,4-di-(chloromethyl)-semicarbazide, etc.; substituted thiocarbazides such as methylthiocarbazide, ethylthiocarbazide, propylthiocarbazide, 4,4-dimethylthiocarbazide, diethylthiocarbazide, 2,4-dipropylthiocarbazide, 2- and 4-phenyl-thiocarbazide, benzylthiocarbazide, tolylthiocarbazide, cyclohexylthiocarbazide, diphenylthiocarbazide, 4,4-dibenzylthiocarbazide, 2,4-ditolylthiocarbazide, 4,4-dicyclohexylthiocarbazide, methoxythiocarbazide, ethoxythiocarbazide, 2,4-dimethoxythiocarbazide, 4,4-diethoxythiocarbazide, phenoxythiocarbazide, 2,4-diphenoxythiocarbazide, chlorothiocarbazide, 4,4-dichlorothiocarbazide, bromothiocarbazide, 2,4-dibromothiocarbazide, chlorophenylthiocarbazide, 4,4-di-(chlorophenyl)-thiocarbazide, chloromethylthiocarbazide, chloroethylthiocarbazide, 2,4-di-(chloromethyl)-thiocarbazide, etc.; substituted thiosemicarbazides such as methylthiosemicarbazide, ethylthiosemicarbazide, propylthiosemicarbazide, 2,4-dimethylthiosemicarbazide, 2,4-diethylthiosemicarbazide, 2,4-dipropylthiosemicarbazide, phenylthiosemicarbazide, benzylthiosemicarbazide, tolythiosemicarbazide, cyclohexylthiosemicarbazide, 2,4-diphenylthiosemicarbazide, dibenzylthiosemicarbazide, ditolythiosemicarbazide, dicyclohexylthiosemicarbazide, chlorophenylthiosemicarbazide, 2,4-dichlorophenylthiosemicarbazide, chloromethylthiosemicarbazide, chloroethylthiosemicarbazide, 2,4-dichloromethylthiosemicarbazide, etc. It is to be understood that when the starting material comprises a substituted polyamino compound, one of the amino groups must contain at least two hydrogen atoms in order that the condensation with the acid or anhydride thereof be effected. The hereinbefore listed compounds are only representative of the class which may be employed, and the present invention is not necessarily limited thereto.

As hereinbefore set forth these compounds may be prepared by condensing a polyhalo-substituted polyhydropolycyclicdicarboxylic acid or anhydride thereof with a polyamino compound which contains at least three nitrogen atoms in the molecule at condensation conditions which include a temperature in the range of from about ambient (about 25° C.) up to about 250° C. or more and at pressures which may range from atmospheric up to about 50 atmospheres or more. If elevated temperatures in the upper limit of the aforementioned range are employed, it is contemplated that the reaction will be effected at superatmospheric pressures. These superatmospheric pressures are generated by the introduction of a substantially inert gas such as nitrogen into the reaction zone, the pressure which is used being that which is sufficient to maintain a major portion of the reactants in the liquid phase. Generally speaking, the condensation is effected in the presence of a substantially inert organic solvent, and when utilizing such a solvent, the temperature which is then employed may be the reflux temperature of the solvent. Specific examples of the type of solvent which may be employed will include high boiling saturated hydrocarbons such as dodecane, cetane, decalin, and mixtures of various $C_{10}$ to $C_{20}$ hydrocarbons; aromatic hydrocarbons such as benzene, toluene, xylenes, ethylbenzenes, etc.; alcohols such as methyl alcohol, n-propyl alcohol, isopropyl alcohol, glycols, and polyglycols; ethers such as diethyl ether, dipropyl ether, ethylene glycol dimethyl ether, diethylene glycol, dimethyl ether, ethylene glycolmono ethyl ether, etc.; dioxane, ketones such as acetone, methyl ethyl ketone, methyl hexyl ketone, ethyl isoamyl ketone, diisobutyl ketone, etc,; esters such as ethyl acetate, methyl propionate, etc,; as well as dimethyl formamide and dimethyl sulfoxide for reaction temperatures below 100° C. The residence time during which the condensation is effected will be of a duration which is sufficient to effect a substantially complete reaction and may vary from about 0.5 up to about 10 hours or more, the reaction being substantially complete when the theoretical amount of water has been formed. The polyhalo-substituted polyhydropolycyclicdicarboxylic acid or anhydride thereof may be present in the reaction mixture in a ratio within the range of from about 1:1 up to about 10:1 mols of acid or anhydride per mol of polyamino compound, the ratio being dependent on whether a monoimide or di-imide comprises the desired product. In addition, in the preferred embodiment of the invention, the polyamino compound is present in the reaction mixture as a salt such as the carbonate, acetate, propionate, etc., salt in order to insure a more homogeneous reaction mixture and a more convenient ease of condensation between the polyamino compound and the acid or anhydride. When utilizing the polyamino compound as a salt, the reaction can be carried in the presence of a basic oxide such as calcium oxide, barium oxide, strontium oxide, sodium oxide, potassium oxide, etc. In the presence of the oxides, the polyamino compounds are released in a free-amino form to react with the dicarboxylic acid or anhydride thereof to form an imide. The salts formed from the metal oxides precipitate from the reaction medium and the desired product does not turn into the salt form. When an excess of the metal oxides is present, they turn into metal hydroxides by reaction with the water which is produced in the course of formation of the desired imide.

The preparation of these compounds may be effected in any suitable manner and may comprise a batch or continuous type operation. For example, when a batch type operation is used, a quantity of the particular acid or anhydride and the polyamino compound of the type hereinbefore set forth in greater detail is placed in an appropriate apparatus along with a particular solvent. The apparatus, which may comprise a condensation flask, or if superatmospheric pressures are to be employed, a rotating autoclave, is provided with heating means and means for withdrawing the water for reaction is formed. The apparatus is then heated to the desired operating temperature which, if a solvent is used, is the reflux temperature thereof and allowed to proceed for a predetermined residence time. At the end of this time, the apparatus and contents thereof are allowed to cool to room temperature, the excess pressure, if any, is vented and the reaction product is recovered. The product is then separated from any solvent by conventional means such as fractional crystallization, precipitation by diluting the solvent with a non-solvent, evaporation, suction, filtration, extraction, etc., and recovered.

It is also contemplated that the particular N-substituted polyhalopolyhydropolycyclicdicarboximide may be prepared by utilizing a continuous manner of operation. When such a type of operation is used, starting materials comprising the acid or anhydride and the polyamino compound are continuously charged to the reactor which is maintained at the proper operating conditions of temperature and and pressure. In the event that a solvent is to be employed, one or both of the reactants may be dissolved in the solvent prior to entry into said reactor and the mixture charged thereto in a single stream. Alternatively speaking, the solvent may be charged to the reactor in a separate stream, if so desired. Upon completion of the desired residence time, the reactor effluent is continuously withdrawn and the reaction product is isolated by conventional means of the type hereinbefore set forth. In addition, the reaction product is also separated from any unreacted starting materials which may be present in the effluent, the latter being recycled to form a portion of the feed stock. The desired products comprising N-substituted polyhalopolyhydropolycyclicdicarboximides are then recovered.

It is also contemplated that other processes for preparing particular imides may also be utilized. For example, the polyamino compounds may be also reacted with an unsaturated dibasic acid or anhydride, thereafter adding a diolefinic hydrocarbon to the resultant imide, followed by a further addition with a halogenated diene. As an illustrative example of this particular process maleic acid or maleic anhydride may be condensed with guanidine, the resultant imide thereafter condensed with 1,3-butadiene, followed by further addition of hexachlorocyclopentadiene to form N-guanyl-5,6,7,8,9,9-hexachloro-1,2,3,4,4a,-5,8,8a-octahydro-5,8-methano-2,3-naphthalenedicarboximide.

The N-substituted polyhalopolyhydropolycyclicdicarboximides which are used as one component of the novel composition of matter of the present invention will possess the generic formula:

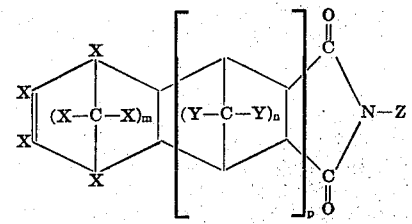

in which X is hydrogen, chlorine or bromine, at least two X's being chlorine or bromine; Y is hydrogen, chlorine or bromine; $m$ is 1 or 2; $n$ ranges from 0 to 2; $p$ is 0 or 1; and Z is selected from the group consisting of guanyl, N-aminoureido, guanido-guanyl, ureido, guanido, thioureido, methylguanyl, ethylguanyl, benzylguanyl, phenylureido, tolylguanido, guanazolocarbimine, cyanoguanyl, pyrimidyl, carbamyloguanyl, and guaniloethyl. Some representative illustrative examples of these compounds will include N-guanyl-5,6,7,8,9,9-hexachloro-1,2,3,4,4a,5,8,8a-octahydro-5,8-methano-2,3-naphthalenedicarboximide, N-guanyl-5,6,7,8,9,9-hexachloro-1,2,3,4,4a,5,8,8a-octahydro-1,4,5,8-dimethano-2,3-naphthalenedicarboximide, N-guanyl-1,4,5,6,7,7-hexachloro-bicyclo-[2.2.1]-5-heptene-2,3-dicarboximide; N-(N-aminoureido)-5,6,7,8,9,9-hexachloro-1,2,3,4,4a,5,8,8a-octahydro-5,8-methano-2,3-naphthalenedicarboximide, N-(N-aminoureido)-5,6,7,8,9,9-hexachloro-1,2,3,4,4a,5,8,8a-octahydro-1,4,5,8-dimethano-2,3-naphthalenedicarboximide, N-(N-aminoureido)-1,4,5,6,7,7-hexachlorobicyclo-[2.2.1]-5-heptene-2,3-dicarboximide; N-(guanidoguanyl)-5,6,7,8,9,9-hexachloro-1,2,3,4,4a,5,8,8a-octahydro-5,8-methano-2,3-naphthalenedicarboximide, N-(guanidoguanyl)-5,6,7,8,9,9-hexachloro-1,2,3,4,4a,5,8,8a-octahydro-1,4,5,8-dimethano-2,3-naphthalenedicarboximide, N-(guanidoguanyl)-1,4,5,6,7,7-hexachlorobicyclo-[2.2.1]-5-heptene-2,3-dicarboximide; N-(ureido)-5,6,7,8,9,9-hexachloro-1,2,3,4,4a,5,8,8a-octahydro-5,8-methano-2,3-naphthalenedicarboximide, N-(ureido)-5,6,7,8,9,9-hexachloro-1,2,3,4,4a,5,8,8a-octahydro-1,4,5,8-dimethano-2,3-naphthalenedicarboximide, N-(ureido)-1,4,5,6,7,7-hexachlorobicyclo-[2.2.1]-5-heptene-2,3-dicarboximide; N-(guanido)-5,6,7,8,9,9-hexachloro-1,2,3,4,4a,5,8,8a-octahydro-5,8-methano-2,3-naphthalenedicarboximide, N-(guanido)-5,6,7,8,9,9-hexachloro-1,2,3,4,4a,5,8,8a-octahydro-1,4,5,8-dimethano-2,3-naphthalenedicarboximide, N-(guanido)-1,4,5,6,7,7-hexachlorobicyclo-[2.2.1]-5-heptene-2,3-dicarboximide; N-(thioureido)-5,6,7,8,9,9-hexachloro-1,2,3,4,4a,5,8,8a-octahydro-5,8-methano-2,3-naphthalenedicarboximide, N-(thioureido)-5,6,7,8,9,9-hexachloro-1,2,3,4,4a,5,8,8a-octahydro-1,4,5,8-dimethano-2,3-naphthalenedicarboximide, N-(thioureido)-1,4,5,6,7,7-hexachlorobicyclo-[2.2.1]-5-heptene-2,3-dicarboximide; N-guanyl-5,6,7,8,9,9-hexabromo-1,2,3,4,4a,5,8,8a-octahydro-5,8-methano-2,3-naphthalenedicarboximide, N-guanyl-5,6,7,8,9,9-hexabromo-1,2,3,4,4a,5,8,8a-octahydro-1,4,5,8-dimethano-2,3-naphthalenedicarboximide, N-quanyl-1,4,5,6,7,7-hexabromo-bicyclo-[2.2.1]-5-heptene-2,3-dicarboximide; N-(N-aminoureido)-5,6,7,8,9,9-hexabromo-1,2,3,4,4a,5,8,8a-octahydro-5,8-methano-2,3-naphthalenedicarboximide, N-(N-aminoureido)-5,6,7,8,9,9-hexabromo-1,2,3,4,4a,5,8,8a-octahydro-1,4,5,8-dimethano-2,3-naphthalenedicarboximide, N-(N-aminoureido)-1,4,5,6,7,7-hexabromobicyclo-[2.2.1]-5-heptene-2,3-dicarboximide; N-(guanidoguanyl)-5,6,7,8,9,9-hexabromo-1,2,3,4,4a,5,8,8a-octahydro-5,8-methano-2,3- naphthalenedicarboximide, N-(guanidoguanyl)-5,6,7,8,9,9-hexabromo-1,2,3,4,4a,5,8,8a-octahydro-1,4,5,8-dimethano-2,3-naphthalenedicarboximide, N-(guanidoguanyl)-1,4,5,6,7,7-hexabromobicyclo-[2.2.1]-5-heptene-2,3-dicarboximide; N-(ureido)-5,6,7,8,9,9-hexabromo-1,2,3,4,4a,5,8,8 a-octahydro-5,8-methano-2,3-naphthalenedicarboximide, N-(ureido)-5,6,7,8,9,9-hexabromo-1,2,3,4,4a,5,8,8a-octahydro-1,4,5,8-dimethano-2,3-naphthalenedicarboximide, N-(ureido)-1,4,5,6,7,7-hexabromobicyclo-[2.2.1]-5-heptene-2,3-dicarboximide; N-(guanido)-5,6,7,8,9,9-hexabromo-1,2,3,4,4a,5,8,8a-octahydro-5,8-methano-2,3-naphthalenedicarboximide; N-(guanido)-5,6,7,8,9,9-hexabromo-1,2,3,4,4a,5,8,8a-octahydro-1,4,5,8-dimethano-2,3-naphthalenedicarboximide, N-(guanido)-1,4,5,6,7,7-hexabromobicyclo-[2.2.1]-5-heptene-2,3-dicarboximide; N-(thioureido)-5,6,7,8,9,9-hexabromo-1,2,3,4,4a,5,8,8a-octahydro-5,8-methano-2,3-naphthalenedicarboximide, N-(thioureido)-5,6,7,8,9,9-hexabromo-1,2,3,4,4a,5,8,8a-octahydro-1,4,5,8-dimethano-2,3-naphthalenedicarboximide, N-(thioureido)-1,4,5,6,7,7-hexabromobicyclo-[2.2.1]-5-heptene-2,3-dicarboximide; N-methylquanyl-5,6,7,8,9,9-hexachloro-1,2,3,4,4a,5,8,8a-octahydro-5,8-methano-2,3-naphthalenedicarboximide, N-methylguanyl-5,6,7,8,9,9-hexachloro-1,2,3,4,4a,5,8,8a-octahydro-1,4,5,8-dimethano-2,3-naphthalenedicarboximide, N-methylguanyl-1,4,5,6,7,7-hexachlorobicyclo-[2.2.1]-5-heptene-2,3-dicarboximide; N-ethylguanyl-5,6,7,8,9,9-hexachloro-1,2,3,4,4a,5,8,8a-octahydro-5,8-methano-2,3-naphthalenedicarboximide, N-ethylguanyl-5,6,7,8,9,9-hexachloro-1,2,3,4,4a5,8,8a-octahydro-1,4,5,8-dimethano-2,3-naphthalenedicarboximide, N-ethylguanyl-1,4,5,6,7,7-hexachlorobicyclo-[2.2.1]-5-heptene-2,3-dicarboximide; N-benzylguanyl-5,6,7,8,9,9-hexachloro-1,2,3,4,4a,5,8,8a-octahydro-5,8-methano-2,3-naphthalenedicarboximide, N-benzylguanyl-5,6,7,8,9,9-hexachloro-1,2,3,4,4a,5,8,8a-octahydro-1,4,5,8-dimethano-2,3-naphthalenedicarboximide, N-benzylguanyl-1,4,5,6,7,7-hexachlorobicyclo-[2.2.1]-5-heptene-2,3-dicarboximide; N-(phenylureido)-5,6,7,8,9,9-hexachloro-1,2,3,4,4a5,8,8a-octahydro-5,8-methano-2,3-naphthalenedicarboximide, N-(phenylureido)-5,6,7,8,9,9-hexachloro-1,2,3,4,4a,5,8,8a-octahydro-1,4,5,8-dimethano-2,3-naphthalenedicarboximide, N-(phenylureido)-1,4,5,6,7,7-hexachlorobicyclo-[2.2.1]-5-heptene-2,3-dicarboximide; N-(tolylguanido)-5,6,7,8,9,9-hexachloro-1,2,3,4,4a,5,8,8a-octahydro- 1,4,5,8-dimethano2,3-naphthalenedicarboximide, N-(tolylguanido)-1,4,5,6,7,7-hexachlorobicyclo-[2.2.1]-5-heptene-2,3-dicarboximide; N-(guanazolyl)-carbimino-5,6,7,8,9,9-hexachloro-1,2,3,4,4a,5,8,8a-octahydro-5,8-methano-2,3-naphthalenedicarboximide, etc. While the above illustrative examples are all drawn to hexahalo-substituted compounds, it is to be understood that compounds containing less than six halogen atoms such as pentachloro-, pentabromo-, tetrachloro-, tetrabromo-, trichloro-, tribromo-, dichloro-, dibromo-substituted compounds also fall within the scope of this invention, said compounds being correspondingly prepared by using pentahalo-, tetrahalo-, trihalo-, and dihalo-substituted dienic hydrocarbons as starting materials. In addition, it is also understood that the compounds set forth comprise the monoimides and that the corresponding diimides may also be prepared by utilizing an excess of the acid or anhydride. It is also to be understood that the aforementioned compounds are only representative of the class of compounds which may be used, and that the present invention is not necessarily limited thereto.

The aforementioned N-substituted polyhalopolyhydropolycyclicdicarboximides are composited with polymeric compounds of the type hereinbefore set forth to form the novel compositions of matter of the present invention, said polymeric compounds including plastics, resins, polymers, copolymers, textiles, etc. For example, the N-substituted polyhalopolyhydropolycyclicdicarboximides in which the substituent on the imide contains at least two nitrogen atoms one of which possesses a functional substituent, may be used as additives to polyolefins, such as polypropylene, whereby the final product will possess advantageous physical properties such as an increased stability against deterioration, weathering, or aging which has been induced by chemical, physical, or biological agents or radiation. In addition, the polyolefins will have a higher ignition point as well as a high degree of flame retardancy. The substituted imides may be added to the polyolefins such as polypropylene, polyethylene, etc., in a range of from about 5 to about 50 percent by weight of the polymeric material to be treated. Thereafter, it will be found that the oxygen index will have been increased while the burning rate will be decreased. Examples of other polymeric products which may be treated with the N-substituted polyhalopolyhydropolycyclicdicarboximides of the present invention will include epoxy resins such as the condensation product of epichlorhydrin bis-phenol-A. The epoxy resins in an uncured state will usually be thermoplastic and may range from low viscosity liquids to high melting point brittle solids. The resins may be cured by mixing a substituted imide of the acid of the type hereinbefore set forth with a resin and thereafter curing the mixture by treatment at an elevated temperature for a predetermined period of time. The resultant product will have the physical characteristics thereof altered to their desirable values as pertains to color stability and flame retardancy, and thus may be utilized for various purposes such as floor, wall, ceiling surfacings, coatings, etc. In addition, some other types of polymeric compounds which may be treated with the novel compositions of matter of the present invention will include polyphenyl ethers which have been extended by treatment with styrene, polycarbonates, polyesters, polyurethane foams, etc.

Some specific examples of the flame retardant novel compositions of matter of the present invention will include mixtures of polypropylene and N-guanyl-5,6,7,8,9,9-hexachloro-1,2,3,4,4a,5,8,8a-octahydro-5,8-methano-2,3-naphthalenedicarboximide; polypropylene and N-guanyl-1,4,5,6,7,7-hexachlorobicyclo-[2.2.1]-5-heptene-2,3-dicarboximide; polypropylene and N-(ureido)-5,6,7,8,9,9-hexachloro-1,2,3,4,4a,5,8,8a-octahydro-5,8-methano-2,3-naphthalenedicarboximide; polypropylene and N-(carbamyloguanyl)-5,6,7,8,9,9-hexachloro-1,2,3,4,4a,5,8,8a-octahydro-5,8-methano-2,3-naphthalenedicarboximide; polypropylene and N-(guanido)-5,6,7,-8,9,9-hexachloro-1,2,3,4,4a,5,8,8a-octahydro-5,8-methano-2,3-naphthalenedicarboximide; polypropylene and N-(guanido)-5,6,7,8,9,9-hexabromo-1,2,3,4,4a,5,8,8a-octahydro-5,8-methano-2,3-naphthalenedicarboximide; polyethylene and N-guanyl-1,4,5,6,7,7-hexachlorobicyclo-[2.2.1]-5-heptene-2,3-dicarboximide; polyethylene and N-(ureido)-5,6,7,8,9,9-hexachloro-1,2,3,4,4a,5,8,8a-octahydro-5,8-methano-2,3-naphthalenedicarboximide; polyethylene and N-(guanido)-5,6,7,8,9,9-hexachloro-1,2,3,4,4a,5,8,8a-octahydro-5,8-methano-2,3-naphthalenedicarboximide; polyethylene and N-(guanido)-5,6,7,8,9,9-hexabromo-1,2,3,4,4a,5,8,8a-octahydro-5,8-methano-2,3-naphthalenedicarboximide; ABS and N-guanyl-1,4,5,6,7,7-hexachlorobicyclo-[2.2.1]-5-heptene-2,3-dicarboximide; ABS and N-(ureido)-5,6,7,8,9,9-hexachloro-1,2,3,4,4a,5,8,8a-octahydro-5,8-methano-2,3-naphthalenedicarboximide; ABS and N-(carbamyloguanyl)-5,6,7,8,9,9-hexachloro-1,2,3,4,4a,5,8,8a-octahydro-5,8-methano-2,3-naphthalenedicarboximide; ABS and N-(guanido)-5,6,7,8,9,9-hexachloro-1,2,3,4,4a,5,8,8a-octahydro-5,8-methano-2,3-naphthalenedicarboximide; ABS and N-(guanido)-5,6,7,8,9,9-hexabromo-1,2,3,4,4a,5,8,8a-octahydro-5,8-methano-2,3-naphthalenedicarboximide; epoxy resin and N-guanyl-1,4,5,6,7,7-hexachlorobicyclo-[2.2.1]-5-heptene-2,3-dicarboximide; epoxy resin and N-(ureido)-5,6,7,8,9,9-hexachloro-1,2,3,4,4a,5,8,8a-octahydro-5,8-methano-2,3-naphthalenedicarboximide; epoxy resin and N-(carbamyloguanyl)-5,6,7,8,9,9-hexachloro-1,2,3,4,4a,5,8,8 a-octahydro-5,8-methano-2,3-naphthalenedicarboximide; epoxy resin and N-(guanido)-5,6,7,8,9,9-hexachloro- 1,2,3,4,4a,5,8,8a-octahydro-5,8-methano-2,3-naphthalenedicarboximide; epoxy resin and N-(guanido)-5,6,7,8,9,9-hexabromo-1,2,3,4,4a,5,8,8a-octahydro-5,8-methano-2,3-naphthalenedicarboximide; polyphenyl ether and N-guanyl-1,4,5,6,7,7-hexachlorobicyclo-[2.2.1]-5-heptene-2,3-dicarboximide; polyphenyl ether and N-(ureido)-5,6,7,8,9,9-hexachloro-1,2,3,4,4a,5,8,8a-octahydro-5,8-methano-2,3-naphthalenedicarboximide; polyphenyl ether and N-(carbamyloguanyl)-5,6,7,8,9,9-hexachloro-1,2,3,4,4a,5,8,8a-octahydro-5,8-methano-2,3-naphthalenedicarboximide; polyphenyl ether and N-(guanido)-5,6,7,8,9,9-hexachloro-1,2,3,4,4a,5,8,8a-octahydro-5,8-methano-2,3-napthalenedicarboximide; polyphenyl ether and N-(guanido)-5,6,7,8,9,9-hexabromo-1,2,3,4,4a,5,8,8a-octahydro-5,8-methano-2,3-naphthalenedicarboximide, etc. It is to be understood that the aforementioned novel compositions of matter are only representative of the class of compositions of matter, and that the present invention is not necessarily limited thereto.

The following examples are given to illustrate the novel compositions of matter of the present invention and which, however, are not intended to limit the generally broad scope of the present invention in strict accordance therewith.

EXAMPLE I

In this example 500 g. (1.18 mol) of 5,6,7,8,9,9-hexachloro-1,2,3,4,4a,5,8,8a-octahydro-5,8-methano-2,3-naphthalenedicarboxylic anhydride, 74 g. (0.4 mol) of guanidine carbonate, 50 g. (0.9 mol) of calcium oxide and 1,000 g. of a solvent comprising the dimethyl ether of diethylene glycol were placed in the glass liner of a rotating autoclave. The autoclave was sealed, warmed and held at a temperature of 180° C. for a period of 10 hours. At the end of this time, heating was discontinued and the vessel and contents thereof allowed to cool to room temperature. The solids were filtered and the mother liquor had a measured amount of water added thereto. A precipitate appeared, which was filtered. The solids were rinsed with methyl alcohol and dried. The addition of certain portions of water to the mother liquor was repeated three more times, each time an additional amount of precipitates forming, which were filtered off and rinsed with additional methyl alcohol. The solid fractions were dried in vacuo and analyzed for basic nitrogen equivalent, and total amount of nitrogen and chlorine (percent). Analytical results indicated those of the fractions which were mainly of the desired products of structures I and II,

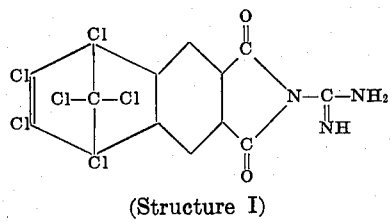

(Structure I)

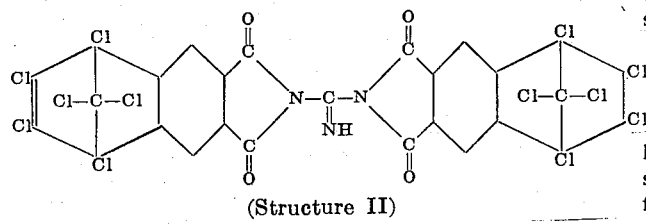

(Structure II)

which are N-guanyl-5,6,7,8,9,9-hexachloro-1,2,3,4,4a,5,8,8a-octahydro-5,8-methano-2,3-naphthalenedicarboximide and di-(N-guanyl-5,6,7,8,9,9-hexachloro-1,2,3,4,4a,5,8,8a-octahydro-5,8-methano-2,3-naphthalenedicarboximido)-carbimine respectively.

EXAMPLE II

In this example 100 g. of an ether of ethylene glycol, 213 g. (0.5 mol) of 5,6,7,8,9,9-hexachloro-1,2,3,4,4a,5,8,8a-octahydro-5,8-methano-2,3-naphthalenedicarboxylic anhydride, 42 g. (0.5 mol) of cyanoguanidine along with 2 g. of a strong-acid resin, Amberlist 15, to catalize the condensation, were placed in a 2-liter, three-neck flask provided with heating, stirring and refluxing means. The mixture was heated to a temperature of 86° C. and refluxed thereat for a period of 8 hours. Following this, heating was discontinued and the mixture was filtered and treated with an equal volume of water. Upon standing a crystalline precipitate occurred. The crystals were filtered and another portion of water added to the filtrate. An additional amount of crystals formed upon standing and were again filtered. The water treatment was repeated three more times with the filtrate, each time an additional amount of crystals forming. The crystals were recovered and dried, said crystals comprising N-cyanoguanyl-5,6,7,8,9,9-hexachloro-1,2,3,4,4a,5,8,8a-octahydro-5,8-methano-2,3-naphthalenedicarboximide.

EXAMPLE III

In this example a mixture of 0.5 mol of 5,6,7,8,9,9-hexachloro-1,2,3,4,4a,5,8,8a-octahydro-5,8-methano-2,3-naphthalenedicarboxylic anhydride, 0.5 mol of semicarbazide hydrochloride and 1.5 liter of a solvent comprising the dimethyl ether of diethylene glycol along with 0.5 mol of calcium oxide is placed in a rotating autoclave which is thereafter heated to a temperature of about 100° C. The autoclave and contents thereof are maintained at this temperature for a period of 4 hours. At the end of this time, heating is discontinued and the autoclave is allowed to return to room temperature. The crystalline material is filtered off and the filtrate or mother liquor is diluted with water. After standing for a period of 16 hours, the crystals which formed are filtered off and the filtrate is again diluted with another portion of water. An additional amount of crystals are formed and filtered off. The filtrate is again treated with water for two more times, each time, upon standing, a crystalline material is formed. The crystals are combined, rinsed with isopropyl alcohol and dried. The crystalline material which is recovered comprises N-(ureido)-5,6,7,8,9,9-hexachloro-1,2,3,4,4a, 5,8,8a-octahydro-5,8-methano-2,3-naphthalenedicarboximide.

EXAMPLE IV

A mixture of equimolar amounts of 1,4,5,6,7,7-hexachlorobicyclo-[2.2.1]-5-heptene-2,3-dicarboxylic anhydride, 2-aminopyrimidine, and some strong-acid resin along with a solvent comprising an ether of ethylene glycol is placed in a rotating autoclave. The sealed autoclave was held at a temperature of about 120° C. for a period of 8 hours. At the end of this time, the autoclave is allowed to return to room temperature and the reaction product is recovered. The solids are separated from the mother liquor by filtration and the mother liquor is treated with an additional amount of water. After standing for a period of 8 hours, the crystals which form are filtered off and the dilution with water of the mother liquor is repeated two more times. The crystals which form after standing for each treatment with water are separated by filtration and combined. The combined crystalline material is treated with hot isopropyl alcohol, recrystallized and dried. The crystals which form upon cooling comprise the desired product which is N-pyrimidyl-1,4,5,6,7,7-hexachlorobicyclo-[2.2.1]-5-heptene-2,3-dicarboximide.

EXAMPLE V

A mixture of 0.5 mol of 5,6,7,8,9,9-hexachloro-1,2,-3,4,4a,5,8,8a-octahydro5,8-methano-2,3-naphthalenedicarboxylic anhydride, 0.5 mol of 1,2,4-triaminobenzene, 5 g. of a strong-acid resin and a solvent comprising the dimethyl ether of diethylene glycol is treated in a manner similar to that set forth in the above examples. Upon completion of the desired residence time, the autoclave is cooled from the operating temperature of about 160° C. and the reaction product is recovered. The solids are separated from the filtered reaction mixture and the filtrate is diluted with an excess of water. The precipitate is filtered, washed with acetone and crystallized from isopropyl alcohol. The crystals which form upon cooling, which comprise N-(3,4-diaminophenyl)-5,6,7,8,9,9-hexachloro-1,2,3,4,4a,5,8,8a-octahydro-5,8-methano-2,3-naphthalenedicarboximide, are recovered.

EXAMPLE VI

In like manner, a mixture of equimolar amounts of 5,6,7,8,9,9-hexabromo-1,2,3,4,4a,5,8,8a-octahydro-5,8-methano-2,3-naphthalenedicarboxylic anhydride, guanylurea sulfate, and calcium oxide along with a solvent comprising an ether of ethylene glycol is placed in an autoclave which is heated to a temperature of 160° C. After maintaining the autoclave at this temperature for a period of 8 hours, heating is discontinued, the apparatus is allowed to return to room temperature, the autoclave is opened, and the reaction mixture is recovered therefrom. The solid material is separated from the mother liquor, the latter being then treated with an excess of water and allowed to stand for a period of 8 hours. This procedure is repeated three more times, each time the crystals which form upon standing being separated from the mother liquor. The crystals are combined, treated with hot isopropyl alcohol and allowed to recrystallize upon cooling. The thus formed crystals comprise N-(carbamyloguanyl)-5,6,7,8,9,9-hexabromo-1,2,3,4,4a,5,8,8a-octahydro-5,8-methano-2,3-naphthalenedicarboximide.

EXAMPLE VII

In this example equimolar amounts of 5,6,7,8,9,9-hexachloro-1,2,3,4,4a,5,8,8a-octahydro-5,8-methano-2,3-naphthalenedicarboxylic anhydride and 1-guanylguanazole along with the solvent comprising the dimethyl ether of diethylene glycol is treated in a manner similar to that set forth in the above examples. The desired product after recovering and recrystallization comprises N-(guanazolocarbimine)-5,6,7,8,9,9-hexachloro-1,2,3,4,4a,5,8,8a-octahydro-5,8-methano-2,3-naphthalenedicarboximide.

EXAMPLE VIII

A mixture of 1 mol of 5,6,7,8,9,9-hexabromo-1,2,3,4,4a,5,8,8a-octahydro-5,8-methano-2,3-naphthalenedicarboxylic anhydride 1 mol of oxaldiamidine, and 10 g. of a strong-acid resin, along with a solvent comprising an ether of ethylene glycol is treated in a manner hereinbefore set forth. Upon recovery and combining the crystalline products which form upon standing, the crystals are treated with hot isopropyl alcohol and recrystallized upon cooling. These crystals comprise N-(2-guaniloethyl)-5,6,7,8,9,9-hexabromo-1,2,3,4,4a,5,8,8a-octahydro-5,8-methano-2,3-naphthalenedicarboximide.

EXAMPLE IX

To illustrate the efficiency of the novel compositions of matter of the present invention as flame retardants, two strips of a commercial high molecular weight polypropylene were prepared. Strip A was polypropylene containing 0.15 g. of a commercial polyhydropolycyclic butane oxidation inhibitor. Strip B was prepared by admixing 81 g. of the polypropylene, 19 g. of N-guanyl-5,6,7,8,9,9-hexachloro-1,2,3,4,4a,5,8,8a-octahydro-5,8-methano-2,3-naphthalenedicarboximide and 0.15 g. of the commercial antioxidant. The two strips were prepared by milling the compounds for a period of 5 minutes at 185° C. The treated polypropylene was then cut into strips which contained a glass cloth in the center of the strip to prevent dripping during the combustion. These strips were burned in an apparatus similar to one described by C. P. Fenimore and J. F. Martin in the November, 1966, issue of *Modern Plastics*. The strip of polypropylene which contained only the oxidation inhibitor had an oxygen index (the lowest mol fraction of oxygen sufficient to maintain combustion) of $n = 0.180$ and a rate of burning of 55 seconds per inch. In contrast to this, the strip of polypropylene, B, which contained the N-guanyl-5,6,7,8,9,9-hexachloro-1,2,3,4,4a,5,8,8a-octahydro-5,8-methano-2,3-naphthalenedicarboximide in addition to the oxidation inhibitor had an oxygen index of $n = 0.192$ and a rate of burning of 165 seconds per inch. In addition, this latter strip, B, also had an elongation percentage of 3,942 and a yield value (psi) of 191–215.

It is therefore noted that the strip of polypropylene which contained the N-substituted polyhalopolyhydropolycyclicdicarboximide exhibited a burning rate that was far slower than the strip which did not contain this compound and in addition possessed a greater than average oxygen index.

EXAMPLE X

Another compositiion of matter is prepared by admixing a liquid epoxy resin having an epoxide equivalent weight of 190 and known in the trade as Epon 828 with N-(carbamyoguanyl)-1,4,5,6,7,7-hexachlorobicyclo-[2.2.1]-5-heptene-2,3-dicarboximide. The resulting mixture is then heated until it becomes homogeneous and is poured into molds which are prepared from glass sheets using Teflon spacers. In addition, a mold release agent is also used to facilitate removal of the cured resins from the mold. The molds are placed in an air-circulating oven and allowed to cure for a period of about 6 hours at a temperature of 110° C. By utilizing various widths of spacers, sheets of various thickness are prepared. The sheets are then removed from the mold, cut into strips and are evaluated for flame retardancy. In addition to possessing excellent heat distortion temperatures and hardness, as measured by a Shore durometer, the cured resin will be found to be self-extinguishing when removed from the direct action of a flame.

EXAMPLE XI

In like manner, a mixture is made by admixing a polymer comprising polyphenyl ether (polyphenylene oxide) which has been modified by styrene and N-(ureido)-5,6,7,8,9,9-hexachloro-1,2,3,4,4a,5,8,8a-octahydro-5,8-methano-2,3-naphthalenedicarboximide, said compounds being admixed at an elevated temperature in order to insure that the mixture is homogeneous. After the mixture is poured into molds and allowed to cool, the resulting compositions of matter are removed. The resultant compositions of matter, when tested for flammability will show that the oxygen index is raised and the burning rate in air, as measured by seconds per inch, will be decreased when compared to a strip of polyphenyl ether which has been modified with styrene, but which does not contain the N-substituted polyhalopolyhydropolycyclicdicarboximide.

EXAMPLE XII

A mixture is made by admixing N-cyanoguanyl-5,6,7,8,9,9-hexabromo-1,2,3,4,4a,5,8,8a-octahydro-5,8-methano-2,3,-naphthalenedicarboximide with commercial ABS polymer. The resulting mixture, after milling at an elevated temperature, is cut into strips. The strips are then subjected to a flammability test similar in nature to that described in Example IX above. In addition, a strip of commercial ABS polymer which does not contain the added compound is also subjected to the same flammability test. The results of the test will show that the strip of ABS which comprised the N-cyanoguanyl- 5,6,7,8,9,9-hexabromo-1,2,3,4,4a,5,8,8-octahydro-5,8-methano-2,3-naphthalenedicarboximide will possess an oxygen index greater than the strip of ABS which does not contain the compound and in addition will possess a rate of burning as measured in seconds per inch much slower than that of the untreated ABS polymeric strip.

EXAMPLE XIII

In this example a composition of matter is prepared by admixing 80 g. of a commercial high molecular weight polypropylene with 20 g. of N-(carbamyloguanyl)-5,6,7,8,9,9-hexachloro-1,2,3,4,4a,5,8,8a-octahydro-5,8-methano-2,3-naphthalenedicarboximide and 0.15 g. of a commercial antioxidant. This mixture is milled for a period of 5 minutes at 185° C. and thereafter the treated polypropylene is cut into strips. A second strip, comprising the commercial high molecular weight polypropylene and the antioxidant, is also prepared. The strips are then burned in a manner similar to that set forth in Example IX above. The results of this test will show that the strip of polypropylene which contains the N-(guanazolocarbimine)-5,6,7,8,9,9-hexachloro-1,2,3,4,4a,5,8,8a-octahydro-5,8-methano-2,3-naphthalenedicarboximide will have a greater oxygen index and a slower rate of burning than will the strip which contains only the polypropylene and the oxidation inhibitor.

I claim as my invention:

1. As a composition of matter, a flammable polymer material containing, as a flame retardant, an N-substituted polyhalopolyhydropolycyclic dicarboximide of the formula:

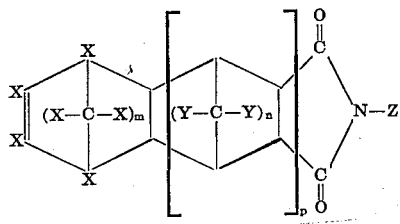

in which X is hydrogen, chlorine or bromine, at least two X's being chlorine or bromine; Y is hydrogen, chlorine or bromine; $m$ is 1 or 2; $n$ ranges from zero to 2; $p$ is 0 or 1; and Z is selected from the group consisting of guanyl, N-aminoureido, guanido-guanyl, ureido, guanido, thioureido, methylguanyl, ethylguanyl, benzylguanyl, phenylureido, tolylguanido, guanazolocarbimine, cyanoguanyl, pyrimidyl, carbamyloguanyl, and guaniloethyl.

2. The composition of claim 1 in which said polymeric material is polyolefin.

3. The composition of matter as set forth in claim 1 in which said N-substituted polyhalopolyhydropolycyclicdicarboximide is present in an amount in the range of from about 5 to about 50 percent by weight of the composition of matter.

4. The composition of matter as set forth in claim 1 in which said polymer material is polypropylene and said N-substituted polyhalopolyhydropolycyclicdicarboximide is N-guanyl-5,6,7,8,9,9-hexachloro-1,2,3,4,4a,5,8,8a-octahydro-5,8-methano-2,3-naphthalenedicarboximide.

5. The composition of matter as set forth in claim 1 in which said polymer material is epoxy resin and said N-substituted polyhalopolyhydropolycyclicdicarboximide is N-(carbamyloguanyl)-1,4,5,6,7,7-hexachlorobicyclo-[2.2.1]-5-heptene-2,3-dicarboximide.

6. The composition of matter as set forth in claim 1 in which said polymer material is polyphenyl ether and said N-substituted polyhalopolyhydropolycyclicdicarboximide is N-(ureido)-5,6,7,8,9,9-hexachloro-1,2,3,4,4a,5,8,8a-octahydro-5,8-methano-2,3-naphthalenedicarboximide.

7. The composition of matter as set forth in claim 1 in which said polymer material is acrylonitrile-butadiene-styrene polymer and said N-substituted polyhalopolyhydropolycyclicdicarboximide is N-cyanoguanyl-5,6,7,8,9,9-hexabromo-1,2,3,4,4a,5,8,8a-octahydro-5,8-methano-2,3-naphthalenedicarboximide.

8. The composition of matter as set forth in claim 1 in which said polymer material is polypropylene and said N-substituted polyhalopolyhydropolycyclicdicarboximide is N-(carbamyloguanyl)-5,6,7,8,9,9-hexachloro-1,2,3,4,4a,5,8,8a-octahydro-5,8-methano-2,3-naphthalenedicarboximide.

* * * * *